(12) United States Patent  
Christensen

(10) Patent No.: US 8,393,493 B1  
(45) Date of Patent: Mar. 12, 2013

(54) DRINK COOLER WITH COLD STORAGE

(76) Inventor: Gordon Christensen, Gladstone, ND (US)

(*) Notice: Subject to any disclaimer, the term of this patent is extended or adjusted under 35 U.S.C. 154(b) by 0 days.

(21) Appl. No.: 13/299,812

(22) Filed: Nov. 18, 2011

(51) Int. Cl.
*A47J 41/00* (2006.01)

(52) U.S. Cl. ............ 220/592.18; 220/23.87; 220/23.88; 220/215; 220/523; 220/630; 137/212; 222/130; 222/400.8

(58) Field of Classification Search .......... 220/215, 220/592.03, 592.18, 630, 23.87, 23.88, 523; 137/212; 222/130, 400.8
See application file for complete search history.

(56) References Cited

U.S. PATENT DOCUMENTS

| | | | |
|---|---|---|---|
| 590,993 A * | 10/1897 | Lochmann | 222/399 |
| 1,096,572 A * | 5/1914 | Stoffel | 220/592.18 |
| 3,641,785 A | 2/1972 | Portz | |
| 6,912,867 B2 | 7/2005 | Busick | |
| 7,150,163 B1 | 12/2006 | McAllister | |
| 2008/0156027 A1 | 7/2008 | Jeong et al. | |

* cited by examiner

*Primary Examiner* — Anthony Stashick  
*Assistant Examiner* — Elizabeth Volz

(57) ABSTRACT

A drink cooler with cold storage that includes an inner wall disposed circumferentially around a central cavity, the central cavity configured to releasably receive a cylindrical storage shaft slidingly insertable to, and retracable from, the central cavity, wherein items stored inside the storage shaft are kept cool by means of a chilled solution (such as ice water) stored within, and dispensible from, an interior cavity disposed between the inner wall and an insulated outer wall.

6 Claims, 5 Drawing Sheets

DRINK COOLER WITH COLD STORAGE

TO ALL WHOM IT MAY CONCERN

Be it known that I, Gordon Christensen, a citizen of the United States, have invented new and useful improvements in a drink cooler with cold storage as described in this specification.

BACKGROUND OF THE INVENTION

Various types of drink coolers are known in the prior art. However, what is needed is a drink cooler with cold storage that includes an inner wall disposed circumferentially around a central cavity, the central cavity configured to releasably receive a cylindrical storage shaft slidingly insertable to, and retracable from, the central cavity, wherein items stored inside the storage shaft are kept cool by means of a chilled solution (such as ice water) stored within, and dispensed from, an interior cavity disposed between the inner wall and an insulated outer wall.

FIELD OF THE INVENTION

The present invention relates to a drink cooler with cold storage, and more particularly, to a drink cooler with cold storage that includes an inner wall disposed circumferentially around a central cavity, the central cavity configured to releasably receive a cylindrical storage shaft slidingly insertable to, and retracable from, the central cavity, wherein items stored inside the storage shaft are kept cool by means of a chilled solution (such as ice water) stored within, and dispensed from, an interior cavity disposed between the inner wall and an insulated outer wall.

SUMMARY OF THE INVENTION

The general purpose of the drink cooler with cold storage, described subsequently in greater detail, is to provide a drink cooler with cold storage which has many novel features that result in a drink cooler with cold storage which is not anticipated, rendered obvious, suggested, or even implied by prior art, either alone or in combination thereof.

Many drink coolers are seen in the prior art. But what is needed is a drink cooler with cold storage enabling storage of items additional to potable solutions in the same device. The present invention, therefore, includes an insulated housing including an insulated outer wall, a base, and an open top end. An inner wall, conductive of heat, is disposed circumferentially around a central cavity. An interior cavity is disposed between the outer wall and the inner wall. Potable liquids are stored in, and decanted from, the interior cavity. The interior cavity is sealingly enclosed when a screw lid is releasably fastened to the top end.

The screw lid includes a central aperture, the central aperture configured to overlie the central cavity. The central cavity, disposed underlying the central aperture, is configured to releasably receive a cylindrical storage shaft, slidingly insertable to, and retractable from, said central cavity. The cylindrical storage shaft includes a first longitudinal cylinder section and a second longitudinal cylinder section. The second longitudinal cylinder section is hingedly attached to the first longitudinal cylinder section along a vertical axis, and releasably fastens to the first longitudinal cylinder section in a closed position to enclose a storage cavity.

A plurality of internal ridges is disposed upon the first longitudinal cylinder section within the storage cavity. Each of a plurality of disk shelves is releasably insertable into each of the plurality of internal ridges. The storage cavity may therefore be partitioned between each of the plurality of disk shelves, as desired, for the storage of items, such as sandwiches, fruit, and other foodstuffs, as preferred.

The storage shaft also includes a top cap disposed atop the first longitudinal cylinder section. The second longitudinal cylinder section releasably engages with the top cap when moved to the closed position. A plurality of ventilation holes is disposed upon the first and second longitudinal cylinder sections to more efficiently conduct heat convectively from the central cavity and keep items stored therein cool. The storage shaft may be retracted from the central cavity by means of a handle disposed atop an upper surface of the top cap. The top cap is configured to releasably engage with the screw lid when the storage shaft is inserted into the central cavity.

Liquids stored in the device are decanted from the interior cavity for imbibing by means of a tap disposed on the outer wall proximal the base of the insulated housing. Thusly, cooled potable liquids, such as ice water, may be stored in the present device and decanted therefrom in the fashion typical of other drink coolers. But the present device enables the cold storage of additional items within the storage cavity of the storage shaft, which items are cooled by the liquids stored in the interior cavity, as desired. Therefore, foodstuffs and additional items may be conveniently stored and accessed from the present drink cooler with cold storage without the need of having additional coolers or storage devices at hand.

Thus has been broadly outlined the more important features of the present drink cooler with cold storage so that the detailed description thereof that follows may be better understood and in order that the present contribution to the art may be better appreciated.

Objects of the present drink cooler with cold storage, along with various novel features that characterize the invention are particularly pointed out in the claims forming a part of this disclosure. For better understanding of the drink cooler with cold storage, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
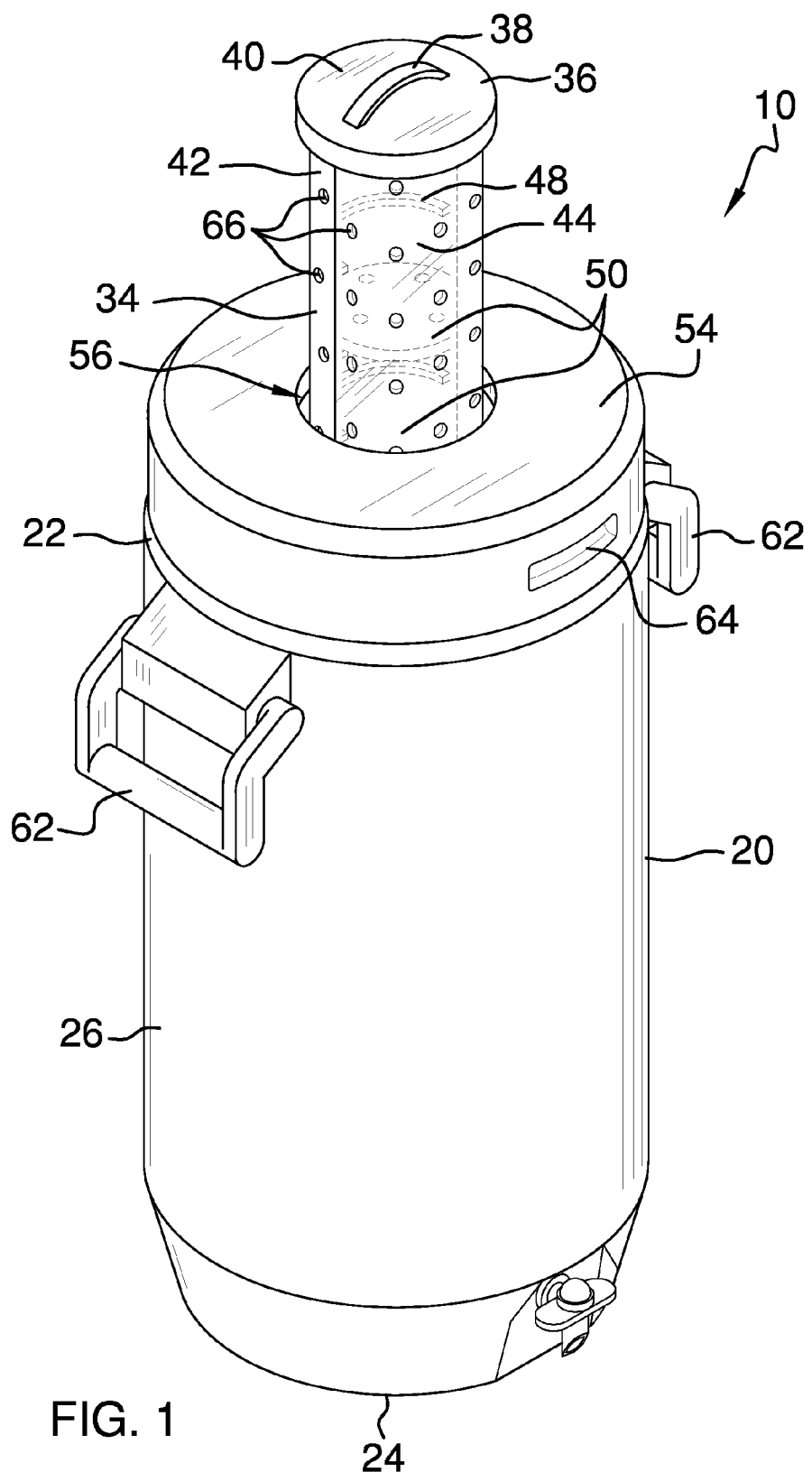
FIG. 1 is a front isometric view.
Figure 2:
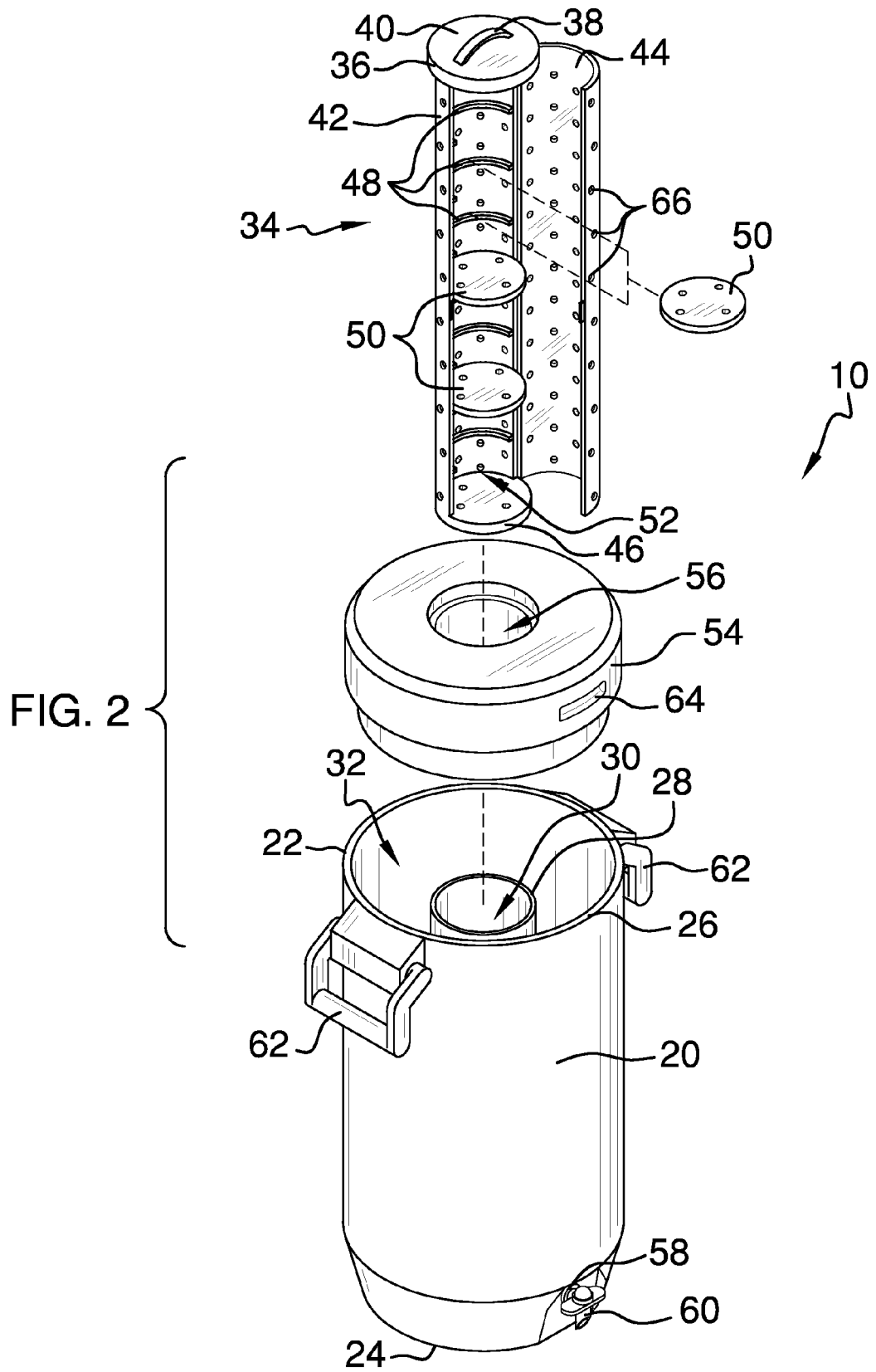
FIG. 2 is an exploded view.
Figure 3:
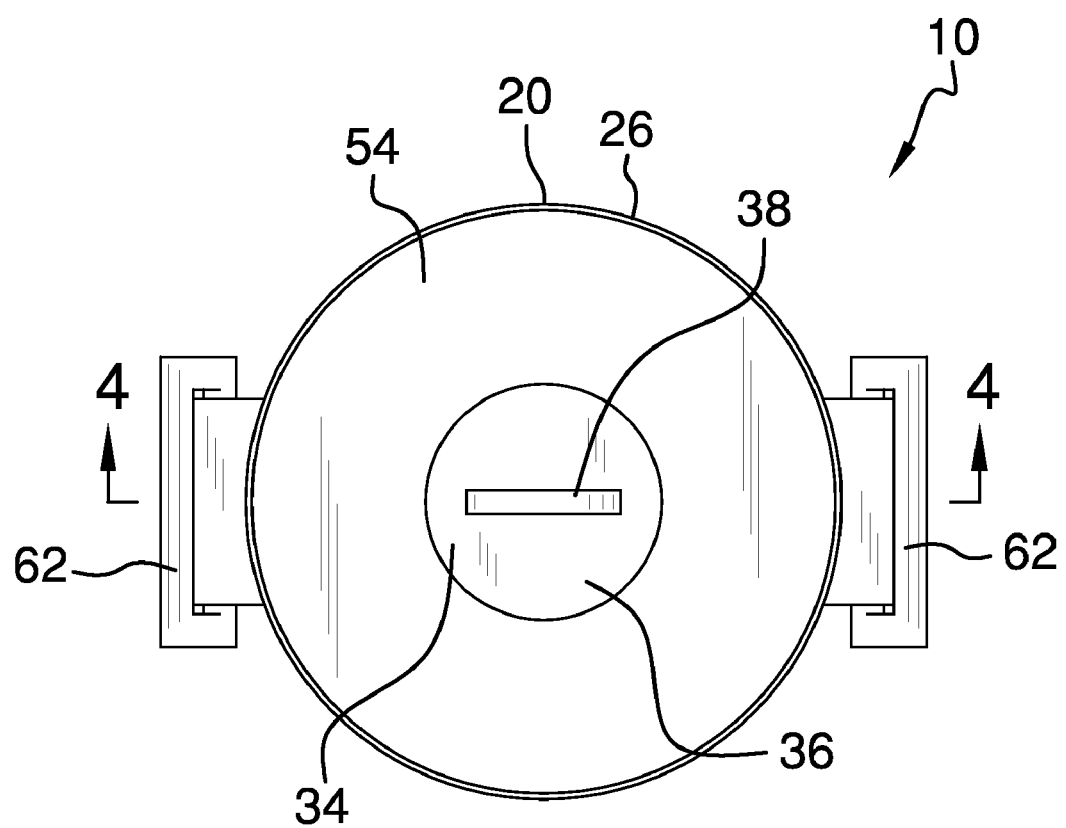
FIG. 3 is a top view.
Figure 4:
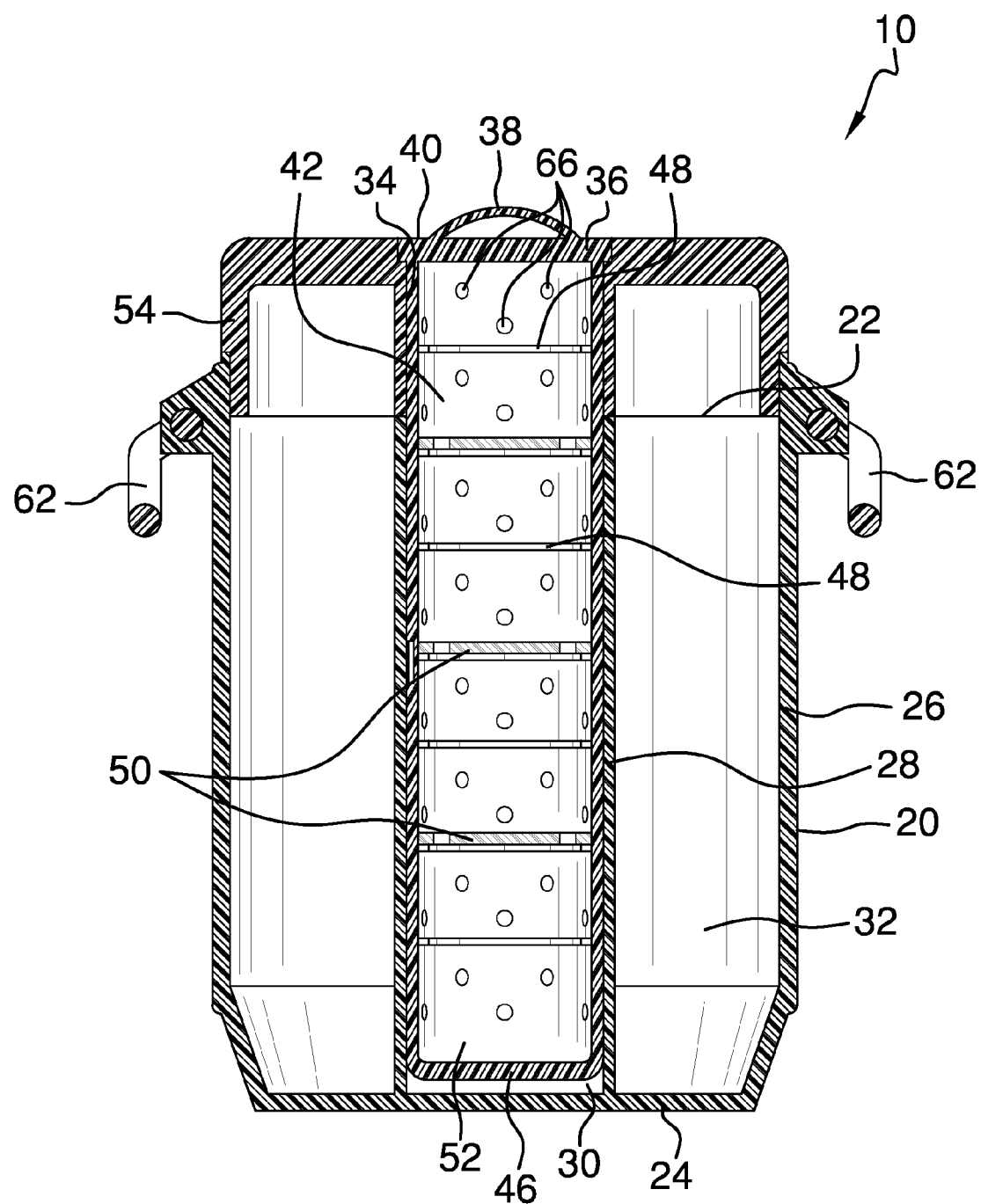
FIG. 4 is a cross-section view taken along the line 4-4 of FIG. 3.
Figure 5:
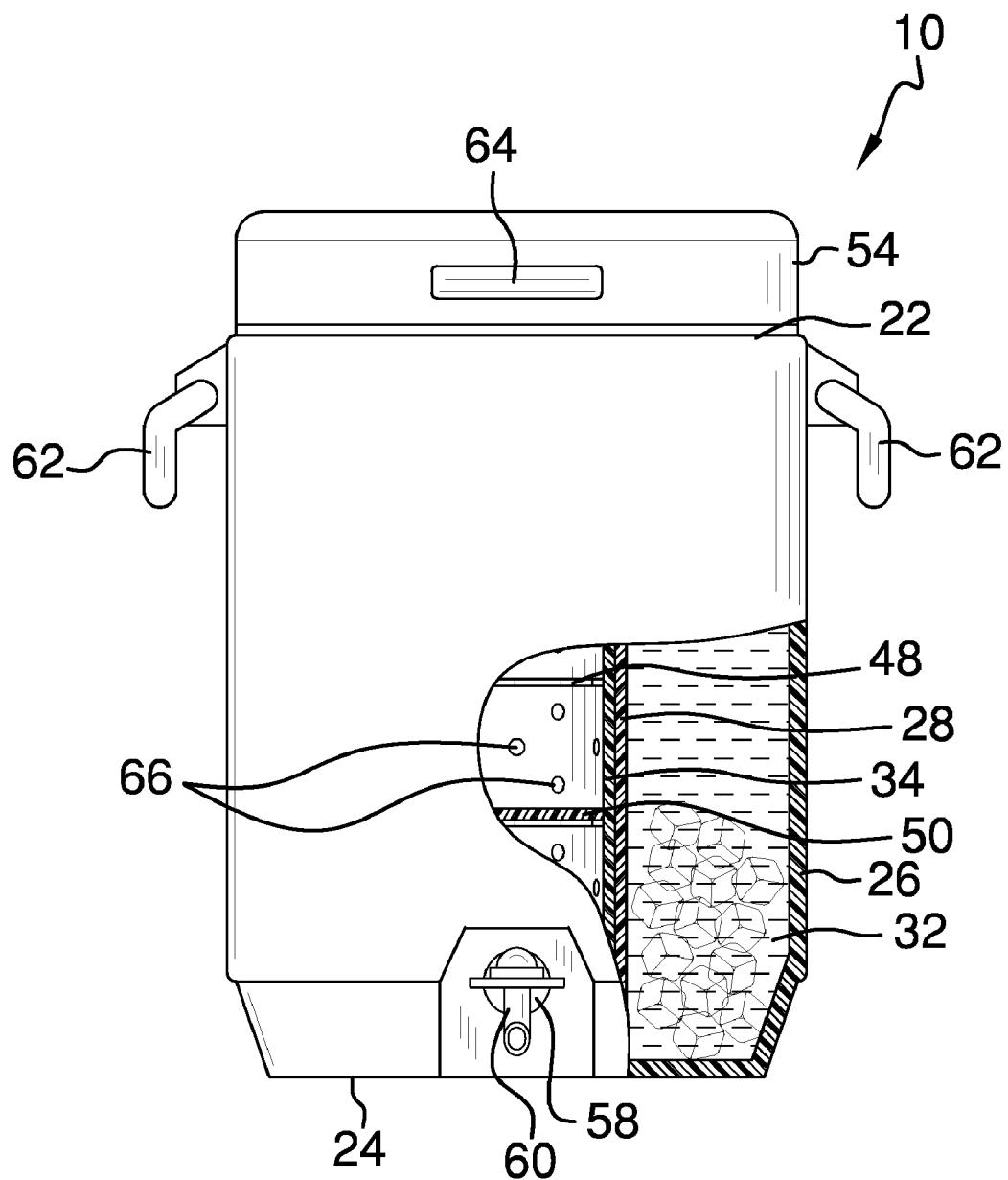
FIG. 5 is a front view with partial cut-away section.

With reference now to the drawings, and in particular FIGS. 1 through 5 thereof, example of the instant drink cooler with cold storage employing the principles and concepts of the present drink cooler with cold storage and generally designated by the reference number 10 will be described.

Referring to FIGS. 1 through 5 a preferred embodiment of the present drink cooler with cold storage 10 is illustrated.

The drink cooler with cold storage 10 includes a generally cylindrical insulated housing 20. The housing 20 includes an open top end 22, a base 24, an insulated outer wall 26, and an inner wall 28, the inner wall 28 disposed circumferentially around a central cavity 30. An interior cavity 32 is disposed between the outer wall 26, the inner wall 28, and the base 24.

A cylindrical storage shaft 34 is slidingly insertable into the central cavity 30 and releasably secureable therein. The storage shaft 34 includes a top cap 36 having a handle 38 disposed on an upper surface 40, a first longitudinal cylinder section 42, a second longitudinal cylinder section 44 hingedly attached to the first longitudinal cylinder section 42 along a vertical axis, a bottom cap 46, and a plurality of internal ridges 48 horizontally disposed within the first longitudinal cylinder section 42. A plurality of ventilation holes 66 is disposed upon the first 42 and second 44 longitudinal cylinder sections to allow for more efficient convective cooling of the central cavity 30.

A plurality of disk shelves 50 is releasably insertable into the first longitudinal cylinder section 42, each of the plurality of disk shelves 50 secureable therein by means of each of the plurality of internal ridges 48. The second longitudinal cylinder section 44 releasably fastens to the first longitudinal cylinder section 42 in a closed position to enclose a storage cavity 52 inside the storage shaft 34. The storage cavity 52 is partitionable by the plurality of disk shelves 50, each of the plurality of disk shelves 50 positional within the storage cavity 52 among each of the plurality of internal ridges 48, as desired. When the first longitudinal cylindrical section 42 and the second longitudinal cylindrical section 44 are in the closed position, the storage shaft 34 is slidingly insertable into the central cavity 30 and removably retractable therefrom. Items, such as foodstuffs, may therefore be stored in the storage cavity 52, and kept cool by means of a cold solution, such as ice water or other potable liquid, stored in the interior cavity 32.

A screw lid 54 is releasably attachable to the top end 22, the screw lid 54 sealingly enclosing the interior cavity 32 when screwed into the top end 22. The screw lid 54 has a recessed handle 64 disposed thereon to provide purchase when opening or closing the device 10. The screw lid 54 has a central aperture 56 disposed therein, through which central aperture 56 the storage shaft 34 releasbly inserts to occupy the central cavity 30. The central aperture 56 is configured to overlie the central cavity 30, with the interior cavity 32 sealingly closeable by the screw lid 54. When placed into the central cavity 30, the storage shaft 34 top cap 36 releasably engages with the screw lid 54 to releasably secure the storage shaft 34 within the central cavity 30. The storage shaft 34 may be easily withdrawn from the central cavity 30 by means of the handle 38 disposed on the top cap 36, and items stored and cooled therein easily accessed by opening the second longitudinal cylinder section 44 and retrieving items from the storage cavity 52, as desired.

A faucet channel 58 is disposed in the outer wall 26 proximal to the base 24, the faucet channel 58 interconnected with the interior cavity 32. A tap 60 is disposed on the outer wall 26, the tap 60 interconnected with the faucet channel 58. Solution stored in the interior cavity 32 may be decanted from the drink cooler with cold storage 10 by means of the tap 60. For portability of the device 10, a pair of handles 62 is disposed on the outer wall 26 proximal the top end 22. The storage shaft 34 is releasably secureable in the central cavity 30 and products placed therein are kept cool by a potable chilled solution, such as water, dispensed from the interior cavity 32 by means of the tap 60.

What is claimed is:

1. A drink cooler with cold storage comprising:
    a generally cylindrical insulated housing comprising:
        an open top end;
        a base;
        an insulated outer wall;
        an inner wall disposed circumferentially around a central cavity;
    an interior cavity disposed between the outer wall and the inner wall and the base;
    a screw lid releasably attachable to the top end;
    a cylindrical storage shaft slidingly insertable into, and retractable from, the central cavity, the storage shaft releasably secureable therein;
    a faucet channel disposed in the outer wall proximal to the base, the faucet channel interconnected with the interior cavity;
    a tap disposed on the outer wall, the tap interconnected with the faucet channel;
    a pair of handles disposed on the outer wall;
    wherein the storage shaft is releasbly secureable in the central cavity and the inner wall is conductive of heat, whereby products placed inside the storage shaft are kept cool by a chilled solution dispensed from the an interior channel by means of the tap.

2. The drink cooler with cold storage of claim 1 wherein the storage shaft further comprises:
    a top cap;
    a first longitudinal cylinder section;
    a second longitudinal cylinder section hingedly attached to the first longitudinal cylinder section along a vertical axis;
    a bottom cap;
    a plurality of internal ridges horizontally disposed within the first longitudinal cylinder section;
    a plurality if disk shelves releasably insertable into the first longitudinal cylinder section, each of the plurality of disk shelves secureable therein by means of each of the plurality of internal ridges;
    wherein the second longitudinal cylinder section releasably fastens to the first longitudinal cylinder section in a closed position to hingedly enclose a storage cavity and the storage shaft is slidingly insertable into the central cavity and removably retractable therefrom.

3. The drink cooler with cold storage of claim 2 wherein the screw lid has a central aperture disposed therein, through which central aperture the storage shaft releasbly inserts to occupy the central cavity.

4. The drink cooler with cold storage of claim 3 wherein the pair of handles are disposed on the outer wall proximal to the top end.

5. The drink cooler with cold storage of claim 4 wherein the screw lid has a recessed handle disposed thereon.

6. The drink cooler with cold storage of claim 5 wherein the storage shaft further comprises a plurality of ventilation holes disposed on the first and second longitudinal cylindrical sections.

\* \* \* \* \*